(12) United States Patent
Chen

(10) Patent No.: US 7,387,062 B2
(45) Date of Patent: Jun. 17, 2008

(54) SEAL RING FREE PISTON STRUCTURE

(75) Inventor: Kuo-Min Chen, Taichung (TW)

(73) Assignee: Victor Taichung Machinery Works Co., Ltd., Taichung (TW)

( * ) Notice: Subject to any disclaimer, the term of this patent is extended or adjusted under 35 U.S.C. 154(b) by 131 days.

(21) Appl. No.: 11/498,626

(22) Filed: Aug. 3, 2006

(65) Prior Publication Data

US 2008/0028928 A1 Feb. 7, 2008

(51) Int. Cl.
*F16J 1/00* (2006.01)
(52) U.S. Cl. ........................ 92/181 R; 92/172
(58) Field of Classification Search .............. 92/172, 92/181 R, 182, 184
See application file for complete search history.

(56) References Cited

U.S. PATENT DOCUMENTS 3,035,879 A * 5/1962 Hanny et al. ............ 92/181 R
3,224,378 A * 12/1965 Graham ..................... 92/182
4,932,313 A * 6/1990 Gutknecht ............... 92/181 R
5,079,997 A * 1/1992 Hong ...................... 92/181 R

* cited by examiner

*Primary Examiner*—Michael Leslie
(74) *Attorney, Agent, or Firm*—Alan Kamrath; Kamrath & Assocaites PA

(57) ABSTRACT

A piston includes a cylindrical body having a neck formed on an outer periphery of the cylindrical body so as to form a first annular disk and a second annular connecting to the first annular disk via the neck, multiple through holes defined through the second annular disk to communicate with a first space among the second annular disk, the neck and the first annular disk, an annular recess defined in an outer periphery of the second annular disk and multiple slits defined through a bottom face defining the annular recess to communicate with a second space below the first annular disk after passing through the neck.

1 Claim, 6 Drawing Sheets

SEAL RING FREE PISTON STRUCTURE

BACKGROUND OF THE INVENTION

1. Field of the Invention

The present invention relates to a piston structure, and more particularly to piston structure which is free of seal ring.

2. Description of the Prior Art

When moving an object upward or downward, a jack or a hydraulic cylinder will be used to save strength. When the hydraulic force of the jack is used, due to the movement of a piston inside the cylinder, resistance from the fluid inside the cylinder provides the necessary force to raise the object such as a tool head to serve as a counter balance cylinder. With reference to FIG. 7, a conventional piston (41) inside a cylinder (40) is shown. The piston (41) is movably received inside the cylinder (40) and due to the existence of the piston (41), an interior of the cylinder (40) is divided into two compartments (400,410). Furthermore, in order to prevent leakage of fluid inside the cylinder (40), a seal ring (43) is provided at both a top portion and a bottom portion of an outer periphery of the piston (41). A friction element (44) is normally mounted between the two seal rings (43) and on the outer periphery of the piston (41) to maintain stable axial movement of the piston (41) inside the cylinder (40). Thus when the piston (41) is moved, movement of the fluid inside the cylinder (40) from one compartment (400 or 410) to the other compartment (410 or 400) provides the necessary force to accomplish the designated tasks.

However, due to the friction between the friction element (44) and the inner side wall of the cylinder (40) and the friction between the seal rings (43) and the inner side wall of the cylinder (40), part of the force driving the piston (41) is used to overcome the above mentioned friction. Furthermore, if the friction element (44) or the seal rings (44) are worn, leakage of the fluid may cause replacement of the entire cylinder.

To overcome the shortcomings, the present invention tends to provide an improved piston structure to mitigate the aforementioned problems.

SUMMARY OF THE INVENTION

The primary objective of the present invention is to provide an improved piston structure which is free of seal ring and still able to move freely inside the cylinder.

In order to accomplish the objective, the piston of the present invention is composed of a cylindrical body with a neck axially formed on the cylindrical body so as to divide the cylindrical body into a first annular disk and a second annular disk and a piston rod extending from a bottom face of the first annular disk. Multiple through holes are defined in a top face of the second annular disk to communicate with a space defined between the first annular disk and the second annular disk. An annular recess is defined in an outer periphery of the second annular disk and multiple slits are defined in a bottom face defining the annular recess and through a bottom face of the first annular disk. When the piston is moved relative to the cylinder, a part of the fluid inside the cylinder flows to the annular recess so as to substantially form a hydraulic sac to maintain balance of the axial movement of the piston inside the cylinder.

Therefore, without the employment of the seal ring, the piston structure of the present invention is still capable of moving up and down inside the cylinder. Besides, the fluid flowing around the piston is intentionally designed so that there is no worry about leakage of fluid within the cylinder.

Other objects, advantages and novel features of the invention will become more apparent from the following detailed description when taken in conjunction with the accompanying drawings.

DETAILED DESCRIPTION OF THE PREFERRED EMBODIMENT

Figure 1:
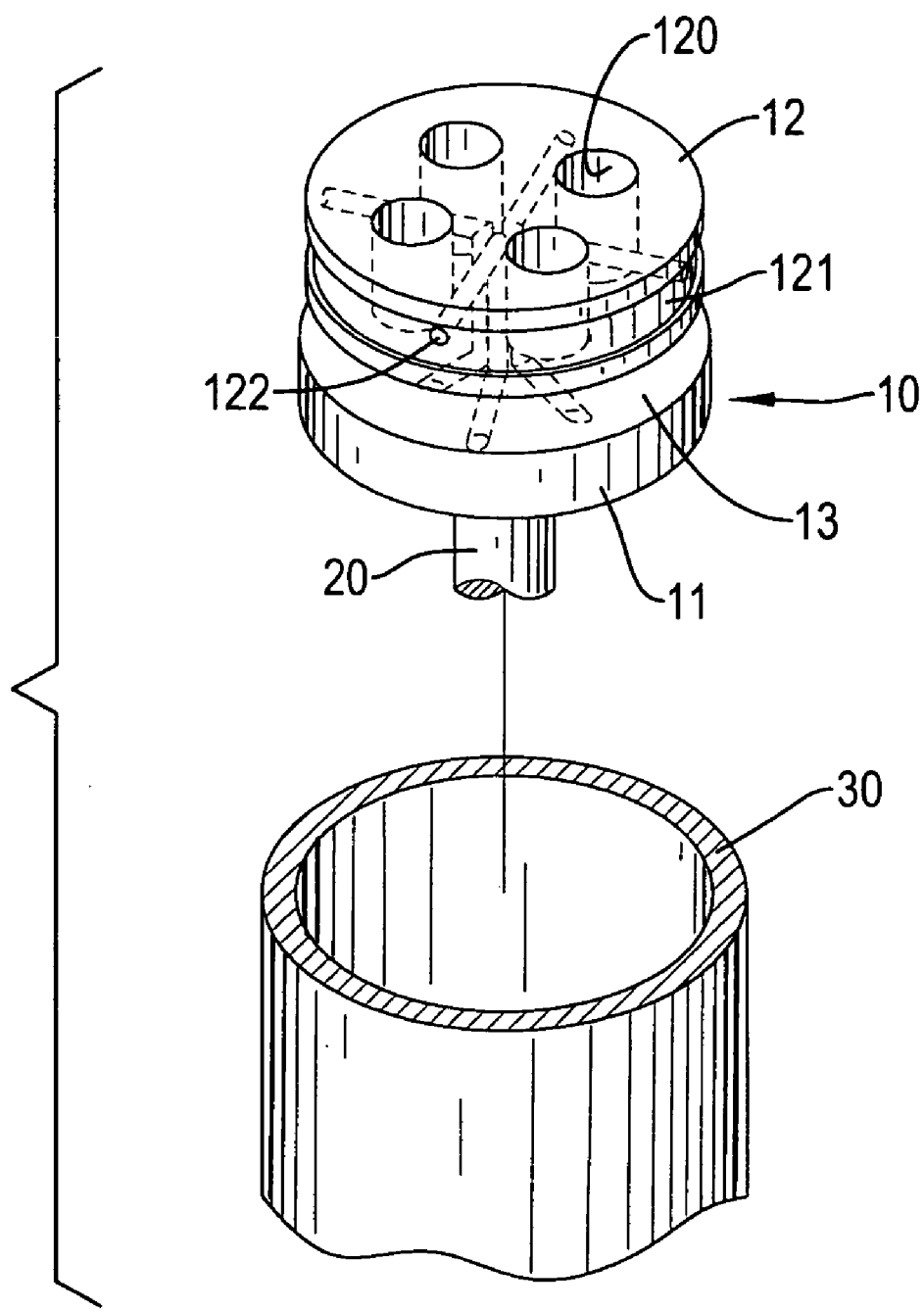
FIG. 1 is an exploded perspective view of the piston of the present invention and a cylinder for the piston.
Figure 2:
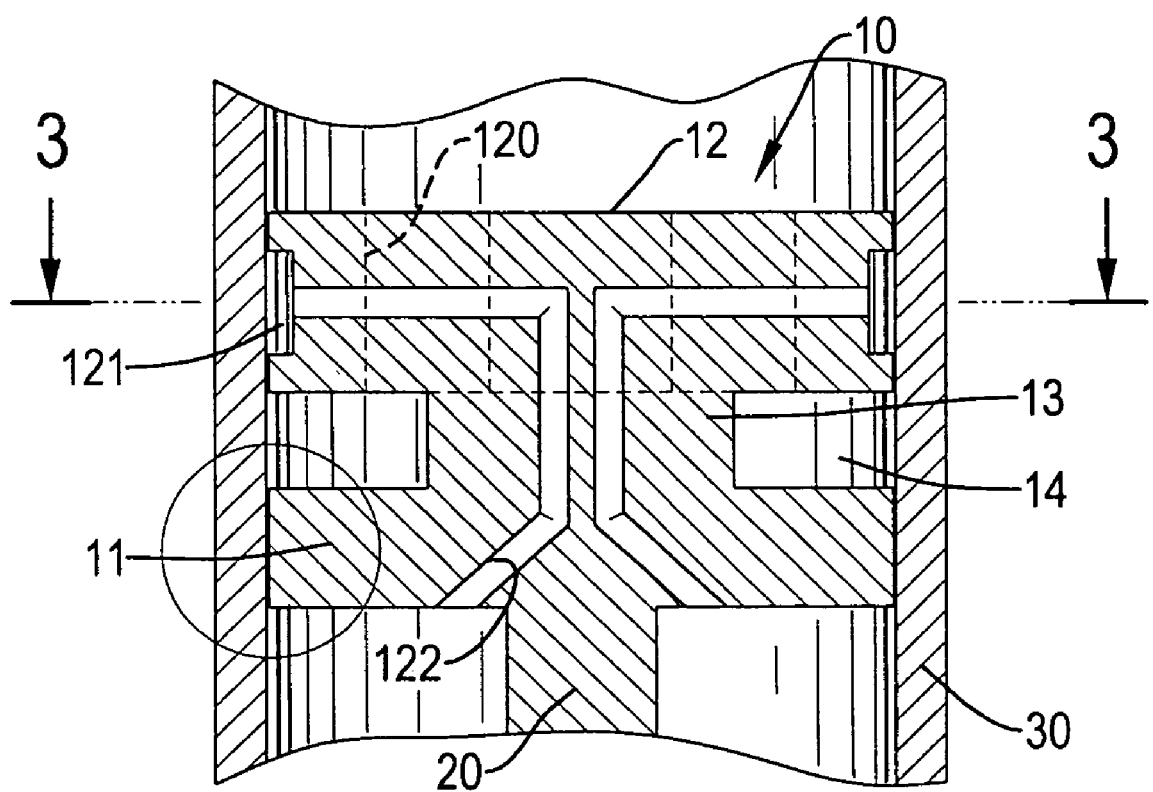
FIG. 2 is a specifically cross sectioned view of the piston of the present invention.
Figure 3:
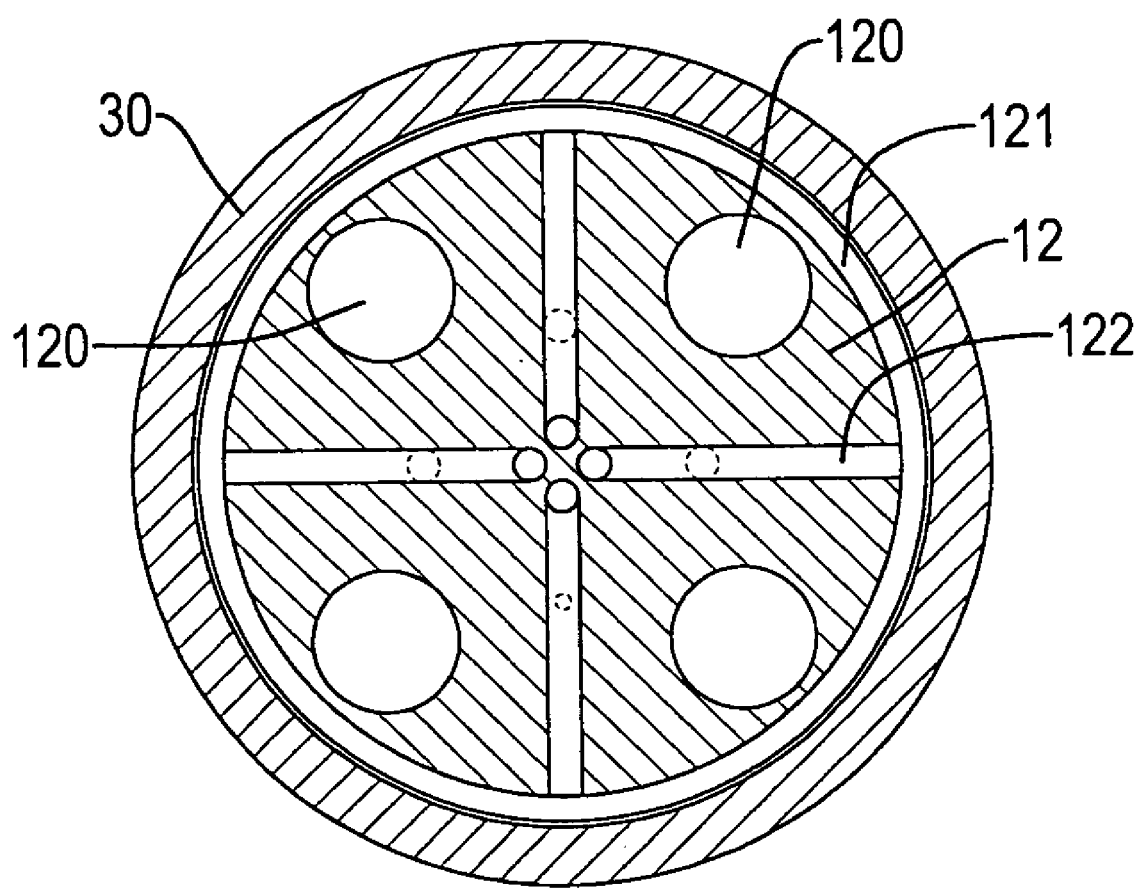
FIG. 3 is a cross sectional view of the piston taken from line 3-3 of FIG. 2.

With reference to FIGS. 1-3, it is noted that the piston in accordance with the present invention includes a cylindrical body (10) and a piston rod (20) extending from a bottom face of cylindrical body (10) of the piston.

The cylindrical body (10) is provided with a neck (13) axially formed on the cylindrical body (10) so as to divide the cylindrical body (10) into a first annular disk (11) and a second annular disk (12) such that the piston rod (20) is extending from a bottom face of the first annular disk (11).

Multiple through holes (120) are defined in a top face of the second annular disk (12) to communicate with a space (14) defined between the first annular disk (11) and the second annular disk (12). An annular recess (121) is defined in an outer periphery of the second annular disk (12) and multiple slits (122) are defined in a bottom face defining the annular recess (121) and through a bottom face of the first annular disk (11) after passing over the neck (13). It is to be noted especially from FIG. 2 that a clearance is defined between the outer periphery of the first annular disk (11) and inner periphery of the cylinder (30).

Figure 4:
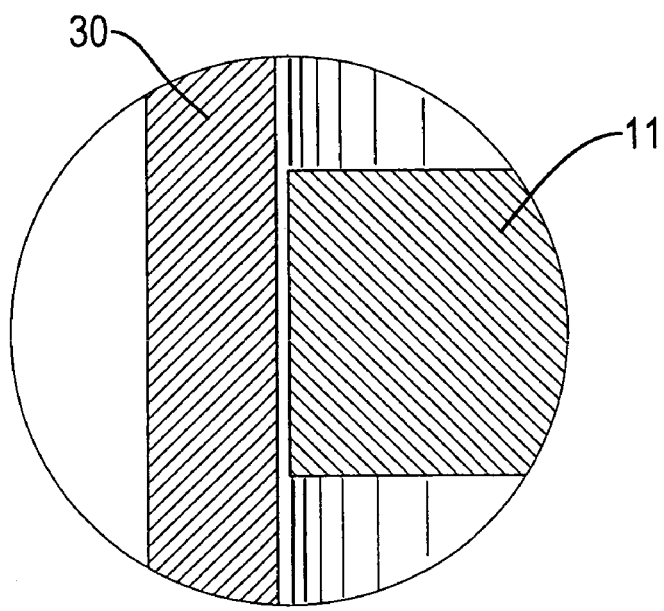
FIG. 4 is a schematic side plan view showing the structure of the outer periphery of the piston of the present invention.
Figure 5:
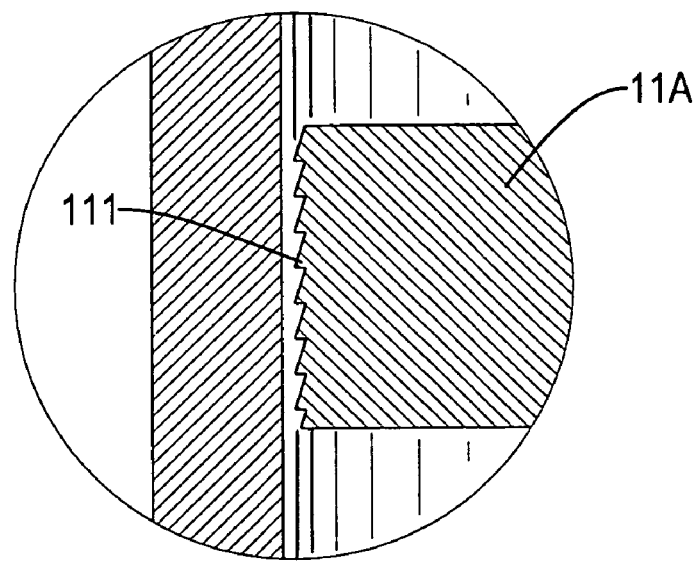
FIG. 5 is a schematic side plan view showing the structure of the outer periphery of the piston of the present invention.

With reference to FIGS. 4 and 5, it is noted that an outer periphery of the first annular disk (11,11') may be smooth and may be provided with teeth (111). Especially when the outer periphery of the first annular disk (11) is provided with teeth (111), the movement of the piston is enhanced.

Figure 6:
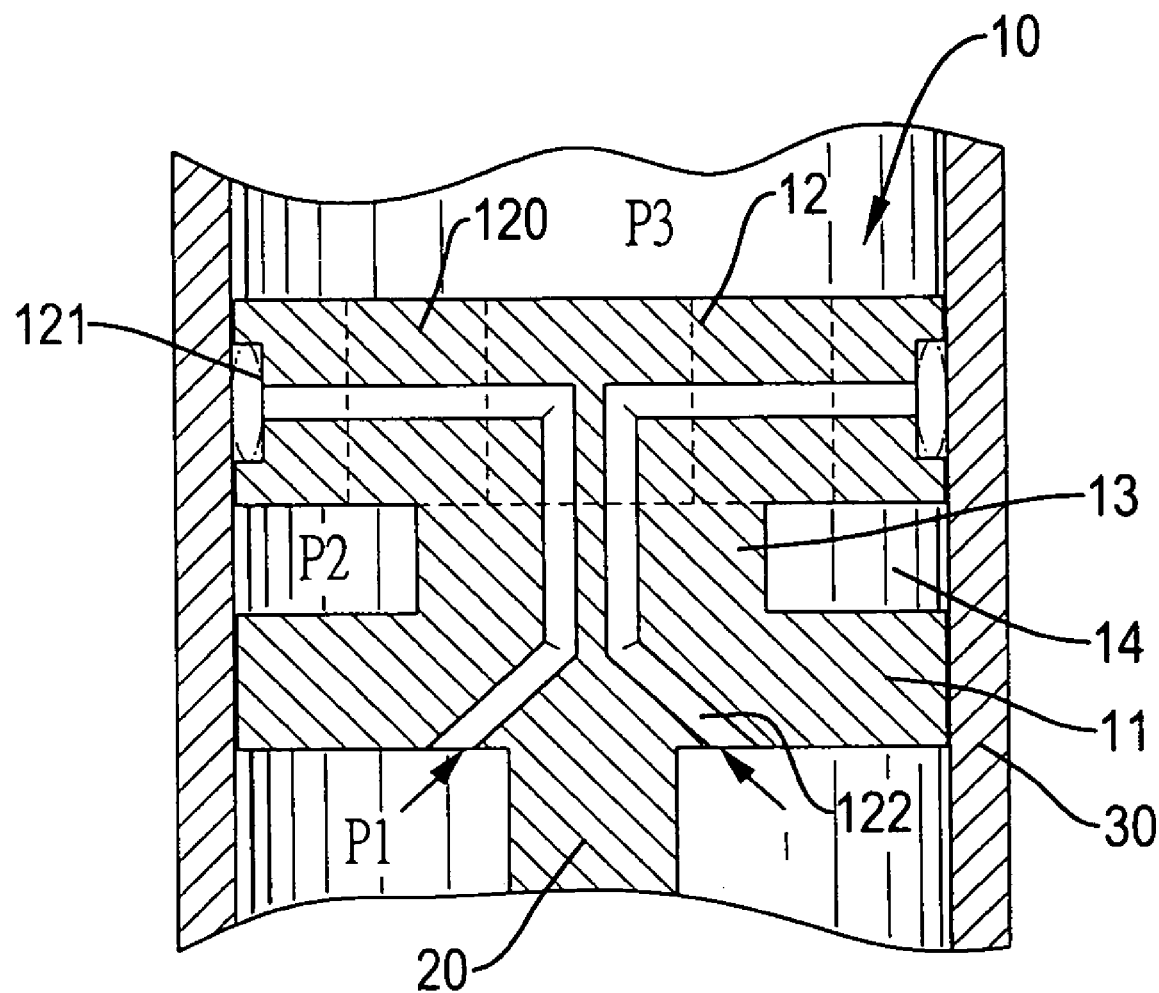
FIG. 6 is an operational view showing the movement of the fluid when the piston is moved inside the cylinder.
Figure 7:
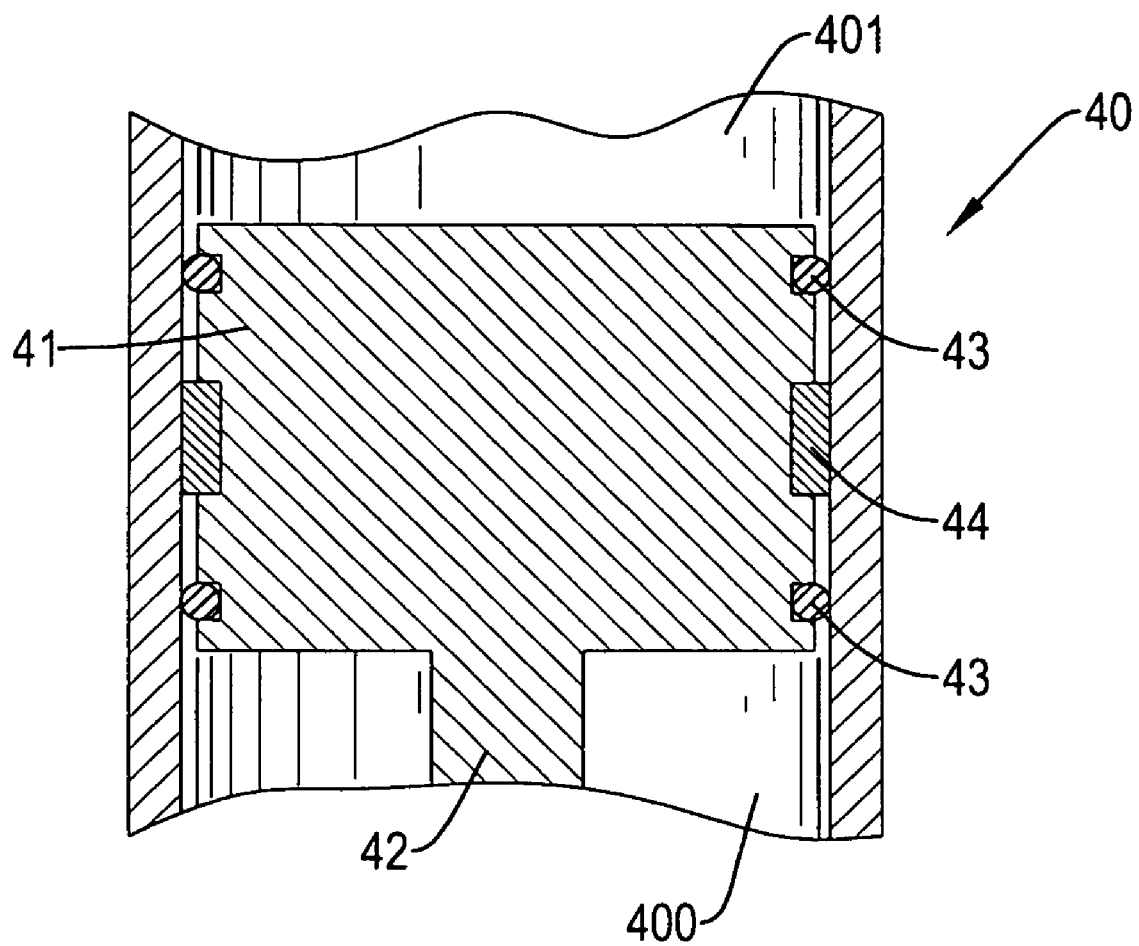
FIG. 7 is a schematically cross sectional view of a conventional piston inside the cylinder.

With reference to FIG. 6, in order to explain the pressure difference in different parts of the piston, the pressure adjacent to the bottom face of the first annular disk (11) is defined as (P1), the pressure in the space (14) which is enclosed by the outer periphery of the neck (13), the first annular disk (11), the second annular disk (12) and the inner side wall of the cylinder (30) is defined as (P2) and the pressure on the top of the second annular disk (12) is defined as (P3). To move the piston upward, the pressure (P1) adjacent to the bottom face of the first annular disk (11) is larger than the pressure (P3) on the top of the second annular disk (12). Because the annular recess (121) communicates with the space below the first annular disk (11), a part of the fluid in the space below the first annular disk (11) will flow to the annular recess (121) via the slits (122) during the upward movement of the piston, thus hydraulic sacs are substantially formed containing in the annular recess (121), and the pressure in the annular recess (121) is same as the pressure (P1). With the generations of the hydraulic sacs, the axial movement of the piston inside the cylinder (30) is kept stable and in balance. Additionally, tiny part of the fluid in the space below the first annular disk (11) will flow into the space (14) via the clearance between the outer periphery of the first annular disk (11) and inner periphery of the cylinder (30), such that the pressures in the spaces are also kept at a relations of P1>P2≈P3 to move the piston upwards. In addition, a part of the fluid in the space below the first annular disk (11) will also flow into the annular recess (121) even when the piston is moved downwards, hydraulic sacs are also formed in the annular recess (121) to keep the movement of the piston stable.

According to the above description, it is noted that there is no provision of the seal ring to the piston and the piston itself is not in contact with the inner side wall of the cylinder (30) such that resistance while the piston is moving inside the cylinder (30) is little and wear of parts of the piston is obviated.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A piston adapted for a cylinder, the piston comprising:
a cylindrical body having a neck formed on an outer periphery of the cylindrical body so as to form a first annular disk and a second annular disk connecting to the first annular disk via the neck, multiple through holes defined through the second annular disk to communicate with a first space confined by a bottom face of the second annular disk, an outer periphery of the neck and a top face of the first annular disk, an annular recess defined in an outer periphery of the second annular disk and multiple slits defined through a bottom face defining the annular recess to communicate with a second space below the first annular disk after passing through the neck,
whereby when the piston is moved relative to the cylinder, a part of fluid inside the cylinder flows to the annular recess via the slits to substantially form hydraulic sacs around the piston so as to maintain balance of axial movement of the piston inside the cylinder.

* * * * *